May 10, 1966  C. S. ROBINSON  3,250,502
SHOCK AND VIBRATION ISOLATING SUPPORT
Filed March 14, 1963  2 Sheets-Sheet 1
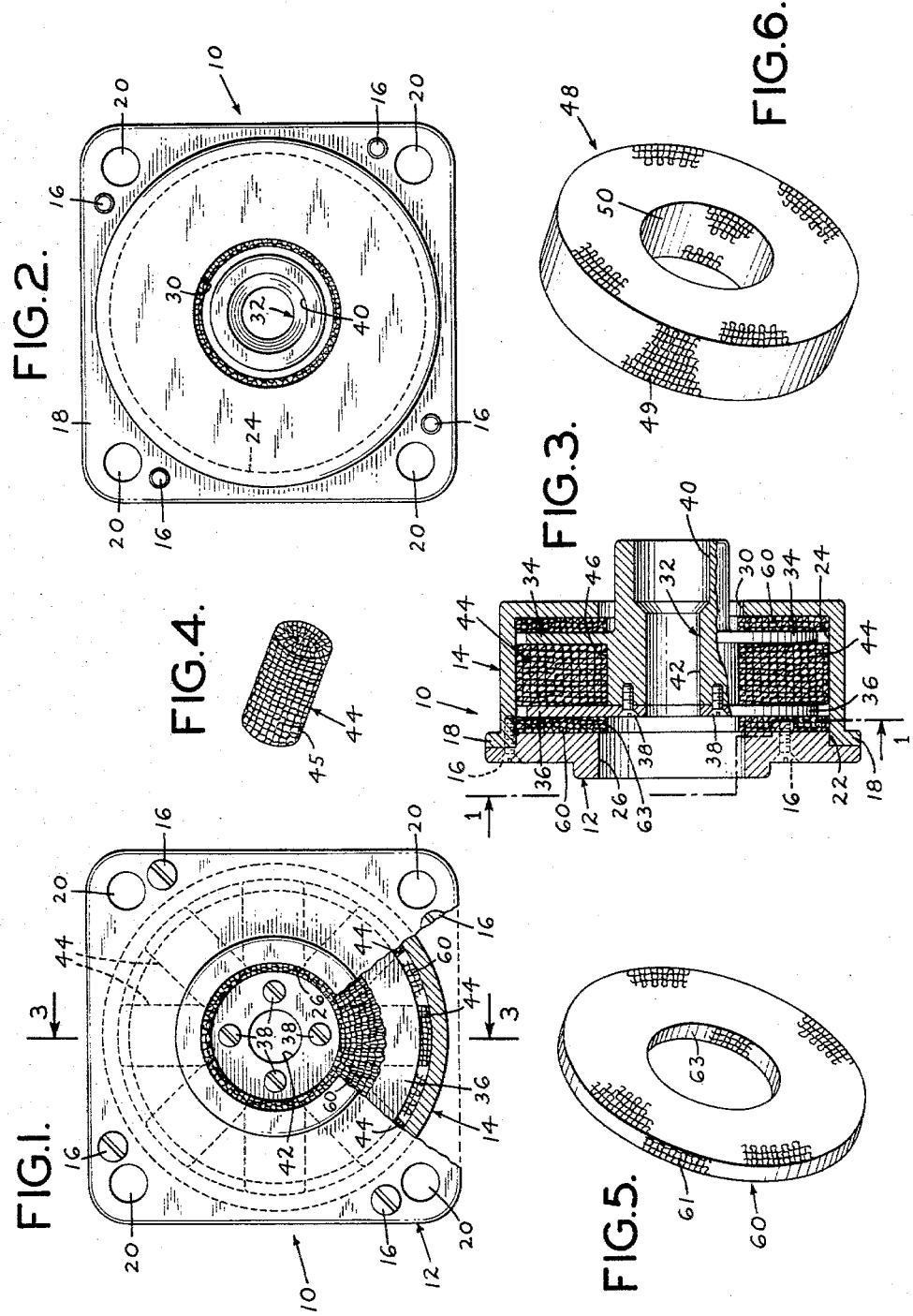

May 10, 1966 C. S. ROBINSON 3,250,502
SHOCK AND VIBRATION ISOLATING SUPPORT
Filed March 14, 1963 2 Sheets-Sheet 2

United States Patent Office 3,250,502
Patented May 10, 1966

3,250,502
SHOCK AND VIBRATION ISOLATING SUPPORT
Cecil S. Robinson, Englewood, N.J., assignor to Robinson Technical Products, Inc., Teterboro, N.J., a corporation of New York
Filed Mar. 14, 1963, Ser. No. 265,222
1 Claim. (Cl. 248—8)

The present invention relates to shock and vibration isolating mounting devices particularly adapted for heavy duty service under severe operating conditions. Certain forms of the present invention are useful as pipe clamps for mounting and protecting pipes, fuel lines and the like in vehicles, ships, rockets or in stationary plants and other forms are especially useful in the mounting of heavy, powerful jet and similar engines in aircraft, inasmuch as they are made entirely of metal and thus remain effective under the extremes of temperature normally encountered in such service. As a result of the particular combination of resilent metallic cushion elements which compress and expand under varying loads, with rigid metal parts, the devices of the present invention may be very compact and light in weight and require no maintenance throughout an extremely long service life.

The mounting devices of the present invention utilize one or more cushions fabricated from relatively fine metal wire in such manner that innumerable short spans of wire between points of contact of the wire with itself serve as delicate springs to isolate vibration. Deflection of the cushions under incrementally increasing loads, due to shock or vibration, is resisted nonlinearly, that is each successive increment of load causes less deflection of the cushion. This is because compression of the cushion causes increasing numbers of wire contact points, thus increasing the resistance to further deflection as a result of shortening and consequent stiffenng of the spans, also with increasing internal friction due to rubbing of the wire upon itself at the contact points within the cushion. The cushion is thus self-damping and when properly designed for a given service may serve as a delicate isolater of vibrations, as a rugged absorber of severe shocks and as an inherently variable damper which is increasingly effective against increasing deflection to reduce excursions between parts at resonance or under heavy shock loading.

The devices of the present invention utilize these characteristics of such cushions and in additon utilize in a unique manner the characteristic of compressibility of such cushions which is in contrast with the incompressible materials such as rubber which are used in many instances. It has been discovered that cushions of the type just described may be utilized in very tight configurations in which the clearance between relatively movable rigid parts may be kept to the minimum required for vibratory and shock-produced excursions between the parts with no need for further clearances or internal spaces to accommodate displaced cushioning material. This provides far greater safety against failure of the devices not only under design loading conditions but also under emergency loading conditions which might far exceed the maximums of design. Even with very small clearances the cushioning material, under emergency loading, will continue to offer sharply increasing resistance to compression as the elastic limit of the cushions is approached and perhaps exceeded and enormous amounts of energy will be absorbed in permanent deformation of the cushions before the rigid parts finally "bottom out." This extra margin of safety can mean the prevention of the loss of an aircraft encountering extreme turbulence or sudden engine malfunction.

It is an object of the present invention to provide a cushioning device including one or more compressible cushions of the type described above, between two parts which are intended to move relatively to one another as permitted by the cushioning device and in which a major portion, usually about 75% or more, of the body of each such cushion is tightly confined in a rigid enclosure which substantially immobilzes the cushion against movement other than movement incident to compression in the design direction or directions.

In the drawings:

FIGURE 1 is an elevational view, with parts broken away, generally upon the irregular line 1—1 in FIGURE 3, of a mounting device embodying the present invention;

FIGURE 2 is an elevational view of the rear of the device shown in FIGURE 1;

FIGURE 3 is a cross-sectional view taken generally along the line 3—3 in FIGURE 1;

FIGURE 4 is a perspective view of one form of radially acting cushion which may be used in the device shown in FIGURE 1;

FIGURE 5 is a perspective view of an axially acting cushion for the device shown in FIGURE 1;

FIGURES 6 and 7 are perspective views of alternative forms of radially acting cushions which may be used in the device shown in FIGURE 1;

Figure 11:
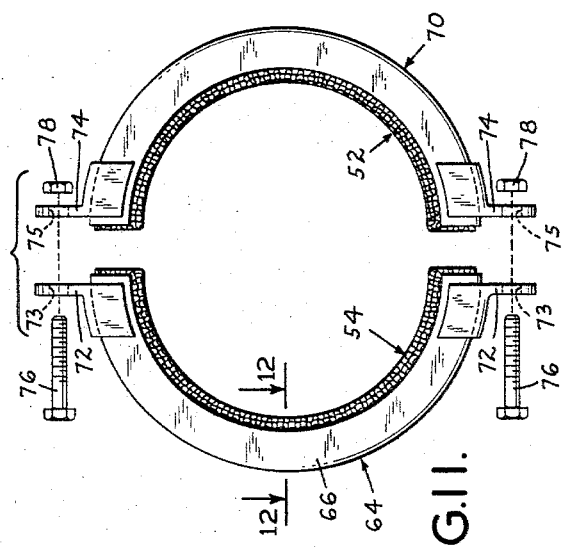
FIGURE 11 is an exploded view of a different form of device embodying the present invention.

Referring now to the drawings a mounting device 10, particularly adapted for the mounting of engines in aircraft or other vehicles is illustrated in FIGURES 1 through 10. As shown in FIGURE 1 the device comprises an outer casing assembled from two principal parts 12 and 14 secured together by screws 16. The part 14 consists essentially of a cylindrical portion to which the reference numeral 14 is applied and a rectangular portion 18 which is substantially coextensive with the rectangular part 12. The rectangular part 12 and rectangular portion 18 are provided with aligned openings to receive the screws 16 and are also provided with aligned openings 20 to receive mounting bolts or the like, not shown, by which the assembled device 10 is secured to the aircraft or other vehicle in which the mounting device 10 is to be used. It will be understood that such mounting bolts will supplement the screws 16 in holding the parts 12 and 14 firmly together when the device 10 is mounted for use.

The rectangular part 12 has formed thereon a cylindrical extension 22 which enters the cylindrical openings in part 14 when the parts 12 and 14 are assembled. This assures accurate centering of the part 12 with respect to the inner cylindrical surface 24 of the part 14. The part 12 is provided with a central opening 26 (see FIG. 3) to provide access to the interior of the assembled device 10 as will be described below. The part 14 is provided with a circular end wall 28 having a central access opening 30 for a similar purpose.

The inner member of the device 10 consists of a hublike structure 32 having axially spaced radially extending circular flanges 34 and 36. The flange 36 may be formed as a separate part and attached to the hub 32 as by screws 38 if so desired. However, when radially acting cushions of certain types to be described herein are used the flange 36 need not be detachable and thus may be formed integrally with the hub 32 if so desired.

The hub 32 is provided with any suitable means for connection with the engine or other device to be isolated from the frame of the vehicle to which the outer member 12, 14 is secured. For example the hub 32 may be provided with a central bore 40 with a reduced portion 42 which may be internally threaded, or not, as desired. Such bore 40, 42 may receive a trunnion of appropriate design secured to the engine. Usually, the trunnion will have a threaded end which will protrude to the left as viewed in FIGURE 3, beyond the hub 32, and a lock nut, not shown, will be threaded onto the end of the trunnion through the access opening 26. As shown in FIGURE 3 the hub 32 includes a portion which extends outwardly through the access opening 30 in the part 14 but it will be understood that the particular design of the hub 32 and its provisions for attachment of the supported load may be varied as required for any particular installation.

The cushioning device or devices for isolation of vibration and shock in directions radial to the axis of the hub 32 may take any of the several forms illustratively disclosed herein. For example, as shown in FIGURES 1 and 3 several substantially cylindrical cushions 44 of the type illustrated individually in FIGURE 4 are employed. Preferably each cushion 44 is made of metal wire 45 and is of such diameter as to fit snugly between the flanges 34 and 36 of the inner member 32 (see FIG. 9). Also, preferably, the diameter of the outer surface 46 of the hub 32 is so chosen that the circumference thereof is somewhat less than a selected multiple of the diameter of the individual cushions 44. Thus, when the device is assembled the selected number of cushions is inserted between the flanges 34 and 36 and when the inner ends thereof are pressed firmly against the surface 46 such inner ends are also jammed together circumferentially of the surface 46 as diagrammatically illustrated in FIGURE 1. The axial lengths of the individual cylindrical cushions 44 is so chosen as to extend radially beyond the outer edges of the flanges 34 and 36 and into contact with the inner cylindrical surface 24 of the part 14 (see FIG. 3). The particular construction and the principles of design of the cushions 44 for different loading and isolation conditions will be discussed in detail below.

Figure 10:
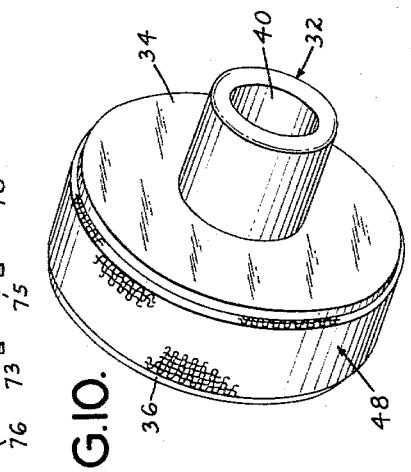
FIGURES 9 and 10 are perspective views showing the member illustrated in FIGURE 8 partially assembled with alternative forms of radially acting cushions.
Figure 9:
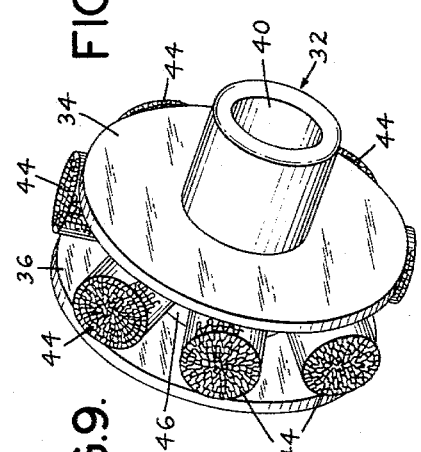
Figure 8:
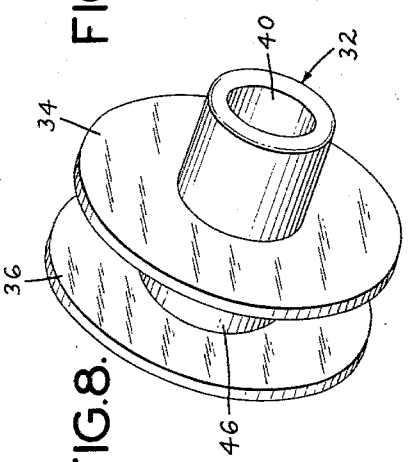
FIGURE 8 is a perspective view of the central member of the device shown in FIGURE 1.

An alternative form of radially acting cushion which may be used instead of the cylindrical cushions 44 is shown in FIGURE 6. Thus a unitary ring 48 made of metal wire 49 is provided having a thickness or axial length equal to the spacing between the inner surfaces of the flanges 34 and 36. The external diameter of the cushion is so chosen as to fit with the desired degree of snugness, as will be discussed below, against the inner surface 24 of the part 14 and the diameter of the central opening 50 is such as to fit snugly upon the outer surface 46 of the hub 32. When this form of cushion is used it is necessary, in assembly of the device 10 to position the cushion 48 upon the hub 32 before the detachable flange 36 is secured to the hub. It will be apparent that such procedure is not necessary when cylindrical cushions 44 are used instead of the unitary ring 48. A hub 32 with a unitary ring 48 fitted therein is illustrated in FIGURE 10.

Figure 7:
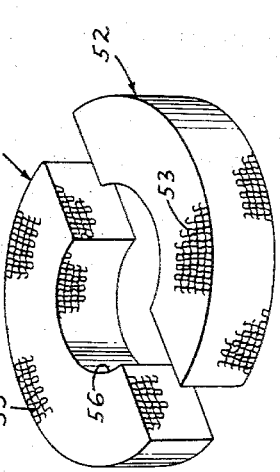

Still another form of radially acting cushion which may be used in the device 10 instead of the cylindrical cushions 44 is illustrated in FIGURE 7. Thus, a splitring cushion is shown comprising two separate portions 52 and 54 which may be identical halves as shown to make up a complete ring. Obviously, the complete ring also may be made up from three or more segments if so desired. The portions 52 and 54 are made of metal wire 53 and the thickness and external diameter of the ring and the internal diameter of the central opening 56 are chosen in the same manner as described above in connection with FIGURE 6. When a split ring made of two or more segments is used it is not necessary to remove or to provide a removable flange 36 on the inner member 32 for purposes of assembly. Split rings when assembled with the inner member 32 will have substantially the same appearance as the unitary ring 48 illustrated in the subassembly shown in FIGURE 10. In some instances it may not be necessary or desired to make the portions 52 and 54 of the split ring in such a manner as to assemble into a complete ring as illustrated herein. Thus, circumferential spaces may be left between the portions or segments when design tolerance is such as not to require completely uniform action in all radial directions. It is a particular advantage of the present invention, however, that because of the compressibility of the cushioning material from which the rings are made, they can be complete and can be tightly confined both axially and radially in the space between the flanges 34 and 36 of the inner member 32.

Cushioning is also provided for isolation of vibration and shock in directions axial of the bore 40 of the inner member 32. Referring now to FIGURE 3 axially acting cushions 60 are shown disposed outside the flanges 34 and 36 and bearing respectively against the end wall 28 of part 14 and against the inner surface of part 12. The cushions 60 are preferably identical and one of them is shown individually in FIGURE 5. Each cushion 60 is made from metal wire 61 and is in the form of a relatively flat washer having a central opening 63 of a diameter approximately the same as the diameter of the access openings 26 and 30 in the outer casing. The external diameter of each ring or washer 60 is approximately the same as the internal diameter of the part 14. Here again, the cushioning rings 60 are closely confined within a space which they substantially completely fill and the compressibility of the cushioning material permits such a configuration which would not be permissible with non-compressible cushioning materials such as rubber.

Usually, the device 10, illustrated in FIGURE 1 will be assembled with the cushioning devices preloaded to such extent as may be desired. Thus the radially acting cushions 44 of FIGURE 1 or the radially acting cushion or cushions 48, 52, 54 illustrated in FIGURES 6 and 7, will be compressed radially after assembly upon the inner member 32 and temporarily clamped by means not shown to prepare the subassembly of FIGURE 9 or FIGURE 10 for insertion into member 14. Also, the unloaded thickness of the cushioning rings or washers 60 is preferably so chosen that when made into a sub-assembly with the inner member 32 the combined thickness or axial dimension of the two cushions plus the outside axial dimension of the flanges 34 and 36 will somewhat exceed the final axial spacing between the inner surfaces of the end wall 28 and the part 12 respectively. Thus, when the complete sub-assembly has been positioned in the part 14, the part 12 is inserted and pressed against the adjacent cushion 60 to compress both cushions 60 as the part 12 is brought into the final position in which it is held by the assembly screws 16. From an observation of FIGURE 1 it will be apparent that the access openings 26 and 28 are substantially smaller in diameter than the flanges 34 and 36 of the inner member 32 whereby the inner and outer members of the device 10 can only be separated by deliberate disassembly or by the application of such shock load as to cause structural failure of one or both of the inner and outer members.

Loads tending to cause relative motion between the inner member 32 and the outer casing 12, 14 in directions strictly parallel with the axis of the bore 40 will be resisted by the cushioning rings 60. Loads tending to cause relative movement in directions strictly normal to such axis will be resisted by the radially acting cushions such as 44, 48, 52, 54. Loads tending to cause relative movement in any other direction will be resisted by combined action of the radially and axially acting cushions.

The embodiment shown in FIGURE 11 utilizes a closely confined metal wire cushion in a structure which may serve for example as a pipe clamp or support. When put to such use the structure is particularly adapted for the support of fuel lines for rockets to protect such lines from damage due to vibration and/or shock. It also is adapted for such critical applications as the support of fuel or fuel lines or other lines in ships, submarines, surface vessels or land vehicles as well as in stationary installation where such lines may be subjected to vibration and/or shock under extremes of temperature. The structure illustrated may consist of two identical or otherwise complementary parts adapted to be assembled around a pipe, rod or the like at any point in the length thereof. For example there may be provided a semi-circular trough-like body 64 having side walls 66 and 68 adapted to receive a semi-circular cushion 54 which has been illustrated in FIGURE 7 and described above. An identical body 70 is adapted to receive another semi-circular cushion 52 which also is illustrated in FIGURE 7 and has been described above. The trough-like bodies 64 and 70 open inwardly of the circle which they together define whereby the cushions 52 and 54 extend inwardly beyond the side walls of the bodies 64 and 70 to engage a pipe or the like of circular cross section and of appropriate outside diameter for use with the assembled structure.

The bodies 64 and 70 may be provided with any suitable means for fastening them together when assembled around a pipe. For example the body 64 may be provided with ears 72 having openings 73 and the body 70 may be provided with ears 74 having openings 75. The openings 73 and 75 are so positioned in the ears 72 and 74 as to come into alignment when the bodies 64 and 70 are put in place around a pipe or the like. The openings 73 and 75 preferably are of such diameter or are slightly elongated in such a manner as to receive bolts 76 with sufficient clearance to permit the ears 72 and 74 to be drawn together upon the bolts 76 and secured in clamped position as by nuts 78. It will be apparent that other well-known forms of securing devices may be used to draw and secure the bodies 64 and 70 in clamping engagement a pipe. For example contractible flexible bands of the type used for clamping rubber bases on fittings may be used.

In any event it is preferred to make the cushions 52 and 54 with such radial dimensions as to project in unloaded condition radially inwardly and beyond the side walls of the bodies 64 and 70 for a predetermined distance which is greater than the distance they will project when clamped around a pipe and are placed under design loading. This is diagrammatically illustrated in FIGURE 12 wherein the radial dimension of the unloaded cushion 54 is shown in full lines and wherein the radial dimension under design loading is indicated by the dotted line 80.

It will be understood that the cushions 52 and 54 will be fabricated and usually precompressed to the desired unloaded size and that the clamping of the bodies 64 and 70 around the pipe may place the cushions under radial compressive forces great enough to further compress the cushions. When the assembled clamp is attached to the body of the vehicle or other support (not shown) the weight of the pipe will usually cause further radial compression of one of the cushions 52 or 54 so that under static load the inner periphery of the assembled cushions 52 and 54 will be circular but eccentric with respect to the bodies 64 and 70. By proper design of the cushions 52 and 54 the minimum projection of the cushion under greatest static and dynamic design loading may be accurately predetermined. In general the minimum projection is such that under maximum design dynamic loading the cushion will be compressed about to the extent illustrated by the dotted line 80 in FIGURE 7. Thus, under the loading conditions for which the device is designed to isolate vibration and shock the cushions 52 and 54 will provide sufficient radial excursion due to compression and expansion of the cushions in various radial directions to prevent contact of the supported pipe with the metal structure of the bodies 64 and 70.

No provision is illustrated in FIGURE 11 for limiting movement of the supported pipe in directions axial of the length of pipe. Suitable provisions may be made as by adapting the structure shown in FIGURE 1 if so desired. Ordinarily, however, the supported pipe may deflect the protruding portions of the cushions 52 and 54 to accommodate limited lengthwise movement when the clamping device is fixed to an immovable support, or alternatively the clamping device may be carried upon a support which affords either limited or unlimited movement in directions parallel with the axis of the supported pipe.

The cylindrical cushions 44 shown in FIGURE 4 preferably are made from metal wire as by compressing a bundle of wires or a bundle of fabric woven or knitted from wire into cylindrical form. The wire may be of any high strength springy metal but it is preferably resistant to rust and/or corrosion, and for this reason a stainless steel wire of suitable springy characteristics is preferred. The bundle of wire or wire fabric is so assembled prior to compression that a substantial percentage, preferably fifty percent or more, of the wire is in the form of individual "lengths," either separated or interconnected at their ends, which lie generally parallel with each other and with the axis of the cylinder into which the bundle is to be formed. Such "lengths" of wire preferably are crimped in closely spaced lateral curves to have a generally undulating shape and, when metal fabric is used, such crimping is present as a result of the weaving or knitting operation. Thus, each "length" will be much like a continuous flattened coil spring with the spring axis extending axially of the cylinder. The bundle is then compressed by pressure exerted in the direction of the axis of the cylinder. Sufficient pressure is applied to overcome the elastic limit of the wire at many points within the bundle to form a cushion of desired firmness. The compression will form or accentuate existing undulations in the "lengths" of wire. In either event there will be a very large number of points of contact of the wire with itself or with adjacent "lengths" and there will be a similarly large number of relatively short spans of wire extending between points of contact within the compressed body of the cushion. The cushion 44 is still springy particularly in the direction of its axis, because a very substantial number of the wire "lengths" still extend, in distorted condition, in directions generally parallel with such axis. Thus, deflection and recovery under changing axial forces over a wide range of design loads may be limited to such an extent as is needed for a particular use. For the present use the maximum deflection under maximum design load may be limited to a few thousandths of an inch.

The ring shaped cushion 48 and the split ring cushion 52, 54 as well as the axially acting washers 60 are made of relatively fine metal wire or wires of the type just described. They may be fabricated by knitting or weaving metal wire as described above and rolled or otherwise bundled into the ring or split-ring shapes after which they are compressed under very heavy pressure to the final shape and density required for a particular use. The non-linear cushioning effect and the high damping described above in connection with the cylindrical cushions 44 are similarly characteristic of the rings or ring elements just described.

Cylindrical cushions such as the cushions 44 have been used heretofore in combination with a helical spring which surrounds the cushion with the axis of the helix of the spring being concentric with the axis of the cylinder of the cushion. Such springs, among other things, have contributed a yielding stability along such common axis whereby the combination tends to return to "center" after being deflected in directions transverse to the common axis. This combination of spring and cushion is highly successful in the support of many objects and in configurations wherein relatively large transverse shock loads and the like are to be encountered it has been customary to provide supplemental limiting devices to prevent transverse displacement beyond the design limits of the cushion and spring combination. In the present invention stability of the cylindrical cushions 44 is achieved by confining them between rigid walls, for example the flanges 34 and 36, for the major portion of axial length of the cylindrical cushions. Thus only about 25%, or preferably less, of the axial length of the cushions is available for displacement transverse the axis. In this manner the axial length necessary to provide the cushioning and damping action in directions parallel with the axis is provided and the entire axial length is available for such cushioning and damping acton because the material from which the cushions are made is compressible. It will be apparent that the radial array of cushions 44 illustrated in FIGURE 1 provides the particular advantage just described. However, it is not necessary to use cylindrical cushions such as 44 which, after all, are circumferentially spaced from one another towards their outer ends, but it is also possible as described above to use ring shaped cushions such as the cushion 48 or the split ring cushion 52, 54 which entirely fill the volume between the flanges 34 and 36. The same considerations apply to the form of the invention illustrated in FIGURES 11 and 12 wherein the major portion of the radial dimension of the cushion elements 52 and 54 is confined between the side walls as illustrated in FIGURE 12 in which the cushion element 54 is confined between the side walls 66 and 68 of the body 64.

Figure 12:
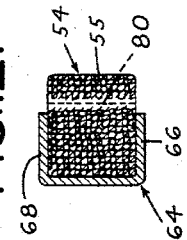
FIGURE 12 is a sectional view taken along the line 12—12 in FIGURE 11.

In connection with FIGURES 11 and 12 it will be appreciated that the preloading of the cushion elements 52 and 54 occurs as an incident to assembly of the device upon the pipe which it is to support. Thus, the device shown in FIGURE 11 is so designed with respect to the diameter of the pipe to be supported that, when assembled with such pipe, the cushioning elements 52 and 54 are compressed in radial directions to such an extent that no more than about 25% of the radial dimension of the cushions 52 and 54 extend inwardly beyond the inner edges of the side walls of the bodies 64 and 70. Preloading of the cushions 52 and 54 in directions parallel with the axis of the pipe to be supported is achieved during manufacture of the components as illustrated in FIGURE 11. Thus, the cushions 52 and 54 may have after the compression thereof beyond their original elastic limits into the ring-segment shape, a dimension parallel with the ring axis which is greater than the spacing between the inner surfaces of the side walls 66 and 68 of the body 64. The cushions are then compressed within their new elastic limit to such an extent as to permit them to be squeezed into space between the side walls of the bodies 64 and 70.

The tight configurations provided in accordance with the present invention present very great advantages with respect to the overall dimensions and total weight of the supports and they are made possible, among other things by the compressibility, the load carrying capacity and temperature tolerance of the cushioning material used herein. The advantages flowing from compressibility have been pointed out above, an important aspect being that no space need be provided for displacement of cushioning material as is the case with non compressible materials such as rubber.

The load carrying capacity of the cushions disclosed herein is approximately twenty times as great per unit area as that of rubber. In jet aircraft, for example, an engine which weighs less than two thousand pounds may produce thrust forces of fifteen thousand or more pounds in normal operation. Also, such engines contain relatively large diameter parts which may rotate at nine thousand or more revolutions per minute. The gyroscopic effect incident to a sudden maneuver of the aircraft or a directional change due to turbulence frequently will produce forces at the engine mountings which are additive to the normal thrust and impose great stress upon the mountings. The cushions utilized in the present invention may be precompressed under enormous pressures to permanently bend the wire into a dense mass still having spring characteristics adequate for isolation of vibration of relatively high frequency and small amplitude which originates in engines of the jet type. Such isolation is achieved by the use of cushions made and arranged as disclosed herein which will safely withstand within their elastic limit, loads in the order or ten thousand pounds per square inch and this is in contrast with a maximum safe loading of about five hundred pounds per square inch for rubber.

Furthermore, rubber mounts must be protected from extremes of temperature. It is customary to provide elaborate air ducts to direct blasts of outside air upon the rubber to carry away some of the heat incident to the conversion by the rubber of energy into heat. This means that rubber cannot be confined within substantially fully enclosed structures such as that illustrated in FIGURE 1 herein when it is to be used in jet engine supports. The ability of the cushions used in the present invention to transfer and radiate heat to the metal structures in which they are confined makes it unnecessary to provide any form of supplemental cooling devices or arrangements.

It should be pointed out that it is not at all unusual for aircraft designs to require that no part of a jet engine move more than about ⅛ inch relative to the portion of the airframe to which the engine is attached under any design stress. In accordance with the present invention this requirement is readily met usually without any metal to metal "bottoming out" in any direction under the maximum design loading. That is, the cushions are still yielding with non-linearly increasing resistance and are still isolating vibration of the engines when maximum design loading is reached. This is in contrast with many previous types of mountings which "bottom out" and cease to function as vibration isolators under loads far below maximum design loading.

I claim:

A supporting device for isolating vibration and shock between two bodies comprising annular cushioning means consisting of a plurality of cylindrical cushions of compressed springy metal wire in which a substantial amount of the wire consists of lengths of wire extending in spans between points of contact of wire with wire, said cylindrical cushions being arranged around an axis which is fixed with respect to one of said bodies with the axes of said cylindrical cushions extending in directions generally radial of said axis, means engaging the outer ends of said cylindrical cushions and fixedly connnected with the other of said bodies, means for engaging the inner ends of said cushions in fixed relation with said one of said bodies, said cylindrical cushions each having as a maximum dimension along any line extending radially of said axis a linear measurement which is of predetermined magnitude, and rigid metal walls fixed to said means for engaging the inner circumference of said annular cushioning means, said walls extending radially of said axis and so spaced lengthwise of said axis as to confine said cylindrical cushions therebetween and substantially to prevent bodily movement of said cushions relative to said walls in directions parallel with said axis, the portions of said walls which engage said cushions having a dimension along any line extending radially of said axis a linear measurement which is at least about 75% of said maximum dimension of said cushions, and the inner ends of said cylindrical cushions being jammed together to form the inner circumference of said annular cushioning means.

References Cited by the Examiner

UNITED STATES PATENTS

| | | | |
|---|---|---|---|
| 1,063,852 | 6/1913 | Carpenter | 248—74 |
| 2,658,710 | 11/1953 | Titus | 248—358.1 |
| 2,775,445 | 12/1956 | Goodloe | 248—358.1 |
| 2,924,419 | 2/1960 | Wells | 248—358.1 |
| 2,994,499 | 8/1961 | Waters | 248—74 |
| 3,073,557 | 1/1963 | Davis | 248—358 X |

CLAUDE A. LE ROY, *Primary Examiner.*

FRANK L. ABBOTT, *Examiner.*